United States Patent

Brakus et al.

[11] 4,156,895
[45] May 29, 1979

[54] TRANSISTOR FLOW THROUGH CONVERTER

[75] Inventors: Bogdan Brakus, Puchheim; Heinrich Kulzer, Pullach; Heinrich Schott, Munich, all of Fed. Rep. of Germany

[73] Assignee: Siemens Aktiengesellschaft, Berlin & Munich, Fed. Rep. of Germany

[21] Appl. No.: 815,244

[22] Filed: Jul. 13, 1977

[30] Foreign Application Priority Data

Jul. 19, 1976 [DE] Fed. Rep. of Germany ....... 2632423

[51] Int. Cl.² ............................................. H02H 7/122
[52] U.S. Cl. ......................................... 363/56; 363/20
[58] Field of Search ....................... 363/50, 52, 53, 55, 363/56; 361/18; 323/17; 307/240, 246, 300

[56] References Cited

U.S. PATENT DOCUMENTS

| | | | |
|---|---|---|---|
| 3,601,622 | 8/1971 | Waaben | 307/300 X |
| 3,816,762 | 6/1974 | Holt, Jr. | 307/300 X |
| 4,016,482 | 4/1977 | Cielo et al. | 363/56 X |

FOREIGN PATENT DOCUMENTS 1175740   8/1964   Fed. Rep. of Germany ............. 363/56

OTHER PUBLICATIONS

"Valvo-Reports", vol. XVIII, book 1/2, pp. 149–151.
Siemans Zejtschrift, 45 (1971), pp. 163–165.

Primary Examiner—William M. Shoop
Assistant Examiner—Peter S. Wong
Attorney, Agent, or Firm—Hill, Gross, Simpson, Van Santen, Steadman, Chiara & Simpson

[57] ABSTRACT

A flow through converter utilizing a transistor as the switching element with its collector emitter path connected in parallel with a capacitor and a transformer which is arranged in the power circuit and the output winding which is connected to a rectifier diode in the series arm and to a free diode in the shunt arm and with a second switching transistor connected in parallel with the adjusting transistors so as to prevent overload on the first transistor.

6 Claims, 1 Drawing Figure

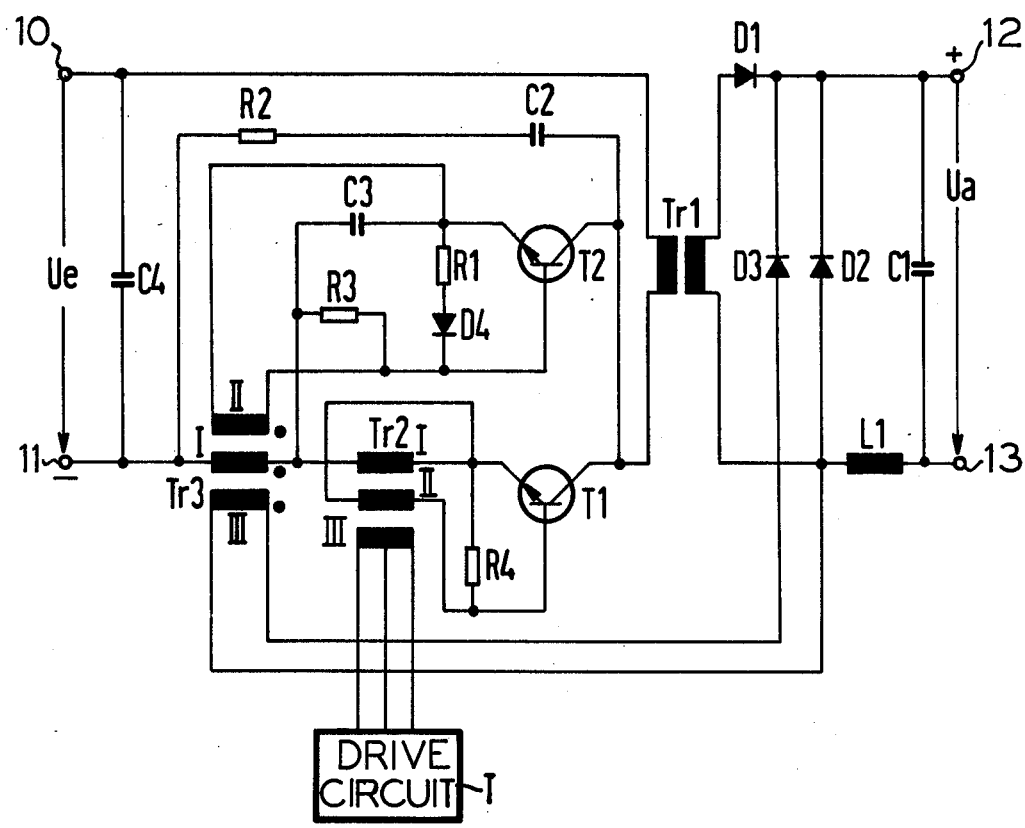

TRANSISTOR FLOW THROUGH CONVERTER

BACKGROUND OF THE INVENTION

1. Field of the Invention

This invention relates generally to flow through converters utilizing transistors as the adjusting element.

2. Description of the Prior Art

Transistor inverter circuits such as shown in German AS 1, 175,740 are known in which a switching transistor operates as an inductive load. So as to protect the switching transistor from voltages which are too high during its blocking phase, the collector path is connected in parallel with a capacitor. Such measure generally allows the switching transistor to be only partially protected from extremely high voltages during disconnection since with particular size capacitors, the capacitors cannot provide an optimum demagnetization of the inductive element and also provide disconnecting protection for the switching transistor. Therefore, the design of specifications of a capacitor in such prior art circuits has required that a compromise be made.

So as to obtain optimum disconnection protection for the switching transistors, the required capacitance of the capacitor would have to be several times greater than that required for the demagnetization.

SUMMARY OF THE INVENTION

The present invention has an object to provide a flow through converter of the type referred to above which has a transistor which is adequately protected when it is disconnected from the load and which independently assures demagnetization of the transformer such that the disconnection protection can be optimized.

According to the invention, in the parallel arm of the collector-emitter path of the adjusting transistor element, a capacitor is provided which provides the disconnecting protection for the transistor adjusting element and serves to demagnetize the transformer and the capacitor for the disconnection protection is connected to the collector emitter path through a switch controlled in synchronism with the control voltage of the transistor switching element as it changes from the conductive to the block state.

An optimum disconnection protection can be accomplished as the one capacitor can be designed so as to be of adequate size for this purpose and can be cut off at the end of the disconnection process of the transistor adjusting device with the aid of a switch. Up until the time of separation, the two capacitors are simultaneously effective for the disconnection protection. This allows the transformer to be demagnetized with the use of the other capacitor alone, so that by a corresponding apportionment of this capacitor the demagnetization can be determined without requiring a compromise.

The protective capacitor which is charged during the disconnection process is discharged through a resistor during a subsequent time interval.

The use of the circuit according to the invention is not limited to a special design of the regulating and control of the DC converter. According to the invention, a simple design circuit is achieved for connecting and disconnecting the capacitor for the disconnection protection function and a switching transistor is provided which is controlled by a current transformer that is connected with its primary in the collector-emitter path of the transistor adjusting element and wherein the emitter-base path of the transistor adjusting element is connected to a secondary winding of the current transformer and that a tertiary winding is closed through a decoupling diode and an additional diode in the output circuit of the flow through converter. A high ohmic discharge resistor is provided for discharging the capacitor. The switching transistor is switched to the "on" state by the emitter or collector current of the transistor adjusting element and its capacitor is discharged following the disconnection of the collector current through a free diode of the DC converter as a result of a short circuit of the base-emitter path of the switching transistor. The switch discharge current of the switching transistor can flow through either the decoupling diode and/or the conductive free diode. The threshold voltages of the two diodes compensate for one another so that the discharge process corresponds to a short circuit of the base-emitter path.

According to a further development of the invention, a discharge current is drawn from the circuit for disconnecting the load and serves to produce a particularly rapid blockage of the switching transistor. The capacitor which is connected with one terminal to the emitter of the switching transistor and has its other terminal connected to the base of the switching transistor through a resistor.

The discharge of the capacitor following the disconnection of the transistor adjusting element is accomplished through a discharge resistor which is connected in series with the parallel combination of a resistor and diode and the base emitter path of the switching transistor.

BRIEF DESCRIPTION OF THE DRAWING

The FIGURE is an electrical schematic diagram of the invention.

DESCRIPTION OF THE PREFERRED EMBODIMENTS

The FIGURE illustrates a pair of input terminals 10 and 11 to which an input voltage $U_e$ is applied. A capacitor C4 is connected across the terminals 10 and 11. A first transformer Tr1 has its primary connected with one side to terminal 10 and the other side to the collector of a transistor T1. The emitter of transistor T1 is connected to a winding of a transformer Ir2 I and the other side of winding 1 of transformer Tr2 is connected to the first side of a winding I of transformer Tr3. The other side of winding I of transformer Tr3 is connected to terminal 11. A resistor R4 is connected between the emitter and base of transistor T1. A second winding II of transformer Tr2 is connected between the base of transistor T1 and the emitter of transistor T1. A drive circuit T which may be a multivibrator is connected to winding III of transformer Tr2. A pair of output terminals 12 and 13 have an output voltage Ua across them and a capacitor C1 is connected across terminals 12 and 13. An inductor L1 has one side connected to terminal 13 and the other side connected to one side of the secondary winding of a transformer Tr1. The other side of the secondary winding of transformer Tr1 is connected to a diode D1 which has its other side connected to terminal 12. A diode D2 is connected between terminal 12 and the junction point between inductor L1 and the secondary of transformer Tr1. A winding III of transformer Tr3 has one side connected to the junction point between inductor L1 and secondary of transformer Tr1 and the other side is connected to a diode D3 which has its other side connected to output terminal 12. A resistor R2 is connected from input terminal 11 to a capacitor C2 which has its other side connected to the collector of transistor T1. A transistor T2 also has its collector connected to the collector of transistor T1 and the emitter of transistor T2 is connected to one end of a winding II of transformer Tr3. The other end of winding II of transformer Tr3 is connected to the base of transistor T2. A resistor R1 and a diode D4 are connected between the emitter and base of transistor T2. A capacitor C3 is connected between the emitter of transistor T2 and the junction point between winding I of transformer Tr3 and winding I of transformer Tr2. A resistor R3 is connected between the base of transistor 2 and the junction points between windings I and I of transformers Tr2 and Tr3.

The FIGURE illustrates a DC flow through converter with a transistor adjusting element T1 and a transformer Tr1 in the power circuit. The on and off switching characteristic of the transistor adjusting element T1 in the flow through converter is determined by the switching times of the power semiconductor which includes the transistor adjusting element T1 and the rectifier diode and by the stray and line inductances in the pulse circuits. When higher powers are transmitted, the switching transistor T1 periodically receives very high loss power pulses. The safe operating range in the $I_C$–$U_{CE}$ curve section can be overshot with very short but high pulses. The current and voltage curve in the $I_C$–$U_{CE}$ curve section is also largely impossible to calculate due to the variation of critical values. The magnitude and duration of the loss power pulses depends upon the power which is to be transmitted. So as to maintain the safe operating range, the static loading of the transistor adjusting element T1 must be therefore considerably reduced. Only by providing a complete switching unloading release system for the transistor adjusting element T1 can its theoretical power limit be exploited. This can generally be only partially accomplished using a capacitor which is arranged in a known manner between the collector and emitter of the transistor adjusting element T1.

The transistor flow through converter illustrated in the FIGURE receives at its input a voltage $U_e$. The output voltage is designated $U_a$. The adjusting element is the power transistor T1 which connects the primary winding of a transformer Tr1 periodically to the input voltage $U_e$. The secondary winding of the transformer Tr1 is connected to an output circuit which is generally conventional and comprises a diode D1 used as a rectifier element followed by a LC filter circuit L1 and C1. A free diode D2 is arranged in the shunt arm and is blocked during the flow through periods of the transistor adjusting element T1.

The adjusting transistor is periodically switched on and off by a drive circuit T by way of the transformer Tr2. The drive circuit can consist of a known multivibrator. The predominant part of the control energy is withdrawn from the emitter circuit of the adjusting transistor T1 by means of a further winding II of the transformer Tr2 according to the feedback principal.

The adjusting transistor T1 is protected from overload by means of a shunt to the adjusting transistor T1 which is formed by a series arrangement of a capacitor C3 and the collector emitter path of a switching transistor T2. The switching transistor T2 is made conductive synchronously with the adjusting transistor T1 with a winding II of the current transformer Tr3. The primary winding I of transformer Tr3 is connected in the emitter circuit of the adjusting transistor T1. During the time in which the adjusting transistor T1 is switched on, the switching transistor T2 carries only a negligible current. After the disconnecting process of the switching transistor T1 has occurred, the switching transistor T2 in the shunt assumes the load current which flows through the capacitor C3. The capacitor C3 prevents a rapid rise and voltage across the adjusting transistor T1. As soon as the capacitor C3 has reached the magnitude of the input voltage, the disconnecting process is completed. The blockage of the switching transistor T2 in the shunt is effected by short circuiting the current transformer Tr3 with the winding III with the free diode D2. The diode D2 becomes a low ohmic impedance due to the current of the storage choke L1 and due to the decoupling diode D3 the threshold voltages which compensate each other. When the discharge process of the switching transistor T2 has been concluded, the transformer Tr1 can be demagnetized with the capacitor C2 and a resistor R2. No further switching losses occur across the switching transistor T2 as the load current is assumed by the free diode D2 following the charging of the capacitor C3. The switch-off time of the switching transistor can be reduced by means of a discharge current from the emitter to the base with the current being taken from the disconnecting load release circuit. For this purpose, the terminal of the capacitor C3 which is connected to the emitter of the adjusting transistor T1 is connected through a resistor R3 to the base of the switching transistor T2. While the capacitor C3 is being charged with an impressed current through the conductive switching transistor T2 in the shunt arm, the discharge current flowing in the switching transistor T2 across the emitter to the base and across the resistor R3 will be proportional to the voltage across the capacitor C3 and will be a powerful discharge current. When the switching transistor T2 becomes blocked, the emitter-base path becomes highly ohmic and the remaining discharge of the capacitor C3 is effected through a resistor R1 which is connected in series with a diode D4 of the emitter-base path of the switching transistor T2. The resistor R1 is selected such that on one hand an adequate voltage-time area is provided for the complete demagnetization of the current transformer Tr3 and on the other hand the permissable emitter-base blocking voltage of the switching transistor T2 is not exceeded. The diode D4 assures that the entire feedback current of the voltage transformer Tr3 which has been supplied by the winding II flows to the base of the switching transistor T2 during the switch on time. After disconnecting has occurred, the winding III of the current transformer again undertakes the static blockage of the switching transistor T2.

A further advantage of the controlled capacitive disconnecting relief system for the transistor adjusting element T1 lies in the fact that the inductive voltage peaks which are produced by the disconnection of the effective stray inductances are suppressed. The stray inductances result in a connection load relief of the transistor adjusting element T1 when supplied with proper values and it can replace the prior art protective choke which is normally used in prior art systems. An adequate stray inductance can be achieved by means of an appropriate design of the transformer Tr1. In this case, the energy which is stored in the stray inductance during the connecting process can be absorbed by the discharge resistor R3 of the capacitor C3.

Although the invention has been described with respect to preferred embodiments thereof, it is not to be so limited as changes and modifications may be made which are within the full intended scope as defined by the appended claims.

We claim as our invention:

1. A flow-through converter having a first transformer in the output circuit which has an output winding connected to a rectifier diode in the series branch, a transistor adjusting means connected to the primary of said first transformer, the collector-emitter path of said adjusting transistor connected in parallel to an arrangement for the disconnection protection of said transistor-adjusting element, further including a capacitor for demagnetization of said first transformer characterized in that respectively first capacitor means (C3, C2) is provided for the disconnection protection of said transistor adjusting element and for the demagnetization of the first transformer (Tr1) in parallel branches relative to the collector-emitter path of said transistor adjusting element (T1), and a capacitor (C3) connected to the collector-emitter path for the disconnection protection means through a switch (T2) synchronously controlled with the control voltage of the transistor adjusting element (T1) during the transition of the transistor adjusting element (T1) from conductive into blocked condition.

2. A flow-through converter according to claim 1, characterized in that a switching transistor, controlled by a current transformer (Tr3) with its primary connected in the collector-emitter circuit of said transistor adjusting element (T1) is provided, said switching transistor with its emitter-base path connected to a secondary winding of said current transformer (Tr2), and a tertiary winding (III) of said current transformer is completed by way of a decoupling diode (D3) to a free wheeling diode (D2) arranged in a parallel branch in the output circuit of the flow-through converter, and a high-ohmic discharge resistor (R3) is connected to the capacitor (C3).

3. A flow-through converter as claimed in claim 2, characterized in that the capacitor (C3) which one terminal connected to the emitter of said switching transistor (T2) has its other terminal connected through said discharge resistor (R3) to the base of said switching transistor (T2).

4. A flow-through converter as claimed in Claim 3, characterized in that a further low-ohmic discharge resistor (R1) is connected in series with a diode (D4) and the combination connected between the emitter and base of the switching transistor (T2).

5. A flow-through converter comprising:
an adjusting transistor,
first, second and third transformers,
a pair of input terminals, first windings of said first, second and third transformers connected in series with the emitter-collector path of said adjusting transistor,
an output circuit connected to a second winding of said first transformer,
a switching transistor,
a first capacitor connected in series with the emitter-collector path of said switching transistor and the combination connected in parallel with the first winding of said second transformer and the emitter-collector of said adjusting transistor,
a second winding of said third transformer with its opposite ends connected to the emitter and base of said switching transistor,
a second winding of said second transformer connected between the emitter and base of said adjusting transistor,
a drive circuit connected to a third winding of said second transformer,
a second capacitor,
a first resistor connected in series with said second capacitor between one of said input terminals and the collector of said switching transistor,
a second resistor,
a first diode connected in series with said second resistor and the combination connected between the emitter and base of said switching transistor, and
a third winding of said third transformer coupled to said output circuit.

6. A flow-through converter according to claim 5 including second, third and fourth diodes with the second diode connected to one side of the second winding of the first transformer, the third diode connected from the other side of said second diode to the other end of the second winding of said first transformer, said third winding of said third transformer with one end connected to the other end of said second winding of said first transformer and its other end connected to said fourth diode and the other side of said fourth diode connected to the junction between said second and third diodes.

* * * * *